US006925998B2

(12) United States Patent
Bruno et al.

(10) Patent No.: US 6,925,998 B2
(45) Date of Patent: Aug. 9, 2005

(54) BARBECUE GRILL ASSEMBLY

(75) Inventors: Adrian A. Bruno, Rolling Meadows, IL (US); Daniel S. Choi, Mundelein, IL (US); J. Michael Alden, Palatine, IL (US); James C. Stephen, Arlington Heights, IL (US)

(73) Assignee: Weber-Stephen Products Co., Palatine, IL (US)

( * ) Notice: Subject to any disclaimer, the term of this patent is extended or adjusted under 35 U.S.C. 154(b) by 14 days.

(21) Appl. No.: 10/438,783

(22) Filed: May 15, 2003

(65) Prior Publication Data

US 2003/0230299 A1 Dec. 18, 2003

Related U.S. Application Data

(60) Provisional application No. 60/380,755, filed on May 15, 2002.

(51) Int. Cl.$^7$ .............................. A47J 37/00; F24C 3/00
(52) U.S. Cl. .................. 126/41 R; 126/25 R; 126/39 B
(58) Field of Search ............................... 126/41 R, 9 R, 126/25 R, 38, 9 B, 40, 39 B

(56) References Cited

U.S. PATENT DOCUMENTS

| | | | | |
|---|---|---|---|---|
| 2,541,528 A | * | 2/1951 | McAvoy .................... | 126/25 A |
| 4,677,964 A | | 7/1987 | Lohmeyer et al. | |
| 4,862,792 A | * | 9/1989 | Lerma, Jr. ................ | 126/25 R |
| 4,941,817 A | | 7/1990 | Schlosser | |
| 5,050,577 A | * | 9/1991 | Baynes et al. ............... | 126/9 R |
| 5,070,776 A | | 12/1991 | Schlosser et al. | |
| 5,072,718 A | * | 12/1991 | Seal .......................... | 126/41 R |
| 5,076,252 A | * | 12/1991 | Schlosser et al. .......... | 126/25 R |
| 5,076,257 A | * | 12/1991 | Raymer et al. ........... | 126/41 R |
| 5,109,834 A | * | 5/1992 | Collins et al. ............. | 126/41 R |
| 5,765,469 A | | 6/1998 | Schlosser et al. | |
| 5,873,355 A | | 2/1999 | Schlosser et al. | |
| 5,934,183 A | | 8/1999 | Schlosser et al. | |
| 5,934,184 A | | 8/1999 | Schlosser et al. | |
| 6,000,389 A | * | 12/1999 | Alpert ....................... | 126/25 R |
| 6,102,028 A | | 8/2000 | Schlosser et al. | |
| 6,131,562 A | | 10/2000 | Schlosser et al. | |
| 6,561,179 B1 | * | 5/2003 | Brake et al. ............... | 126/41 R |

FOREIGN PATENT DOCUMENTS

| | | | | |
|---|---|---|---|---|
| JP | 2002-238778 A | * | 8/2002 | ............. A47J/37/07 |
| WO | WO 03/005869 A2 | * | 1/2003 | ............. A47J/37/00 |

* cited by examiner

*Primary Examiner*—Josiah C. Cocks
(74) *Attorney, Agent, or Firm*—Wallenstein, Wagner & Rockey, Ltd.

(57) ABSTRACT

The present invention provides a barbecue grill assembly with a support frame assembly including a left and right frame assembly. These frame assemblies are formed from a front frame member, a rear frame member, and a side member that connects the front and rear frame members. The grill assembly can have a first and a second horizontal member to connect the frame members of the left and right frame assemblies. The barbecue grill assembly further comprises a cooking chamber with a cover hingeably connected to a firebox. The firebox has a pair of opposed end walls with a mounting assembly that engages a limited extent of the front and rear frame members when the cooking chamber is connected to the support frame assembly. The end wall also have extending rails that define a channel configured to house conduit and fuel lines. Preferably, the left and right frame assemblies are pre-welded to facilitate assembly of the barbecue grill assembly.

34 Claims, 12 Drawing Sheets

BARBECUE GRILL ASSEMBLY

CROSS-REFERENCE TO RELATED APPLICATIONS

This Application claims the benefit of Provisional Application No. 60/380,755, filed on May 15, 2002.

FEDERALLY SPONSORED RESEARCH OR DEVELOPMENT

Not Applicable.

TECHNICAL FIELD

The present invention relates to a barbecue grill assembly. More specifically, the present invention relates to a barbecue grill assembly with a cooking chamber that engages a limited portion of the support frame assembly.

BACKGROUND OF THE INVENTION

The popularity of gas barbecue grills and gas outdoor cooking devices has increased tremendously over the last twenty-five years. Conventional barbecue grills include a cooking chamber and a frame assembly that supports the cooking chamber. Typically, the cooking chamber has a cast bottom and a cast cover. In general terms, the frame assembly includes a plurality of frame members including vertical, horizontal, and transverse members. An example of the conventional design is shown in U.S. Pat. No. 5,109,834 to Collins et al. As shown in FIG. 1 therein, the leg assemblies 12, 14 comprise a pair of frame members 16, 17, 18, 19 bent into an inverted "L-shape." A transverse member 21, 20 connects the frame members 16, 17, 18 19 to form the leg assemblies 12, 14. The base of the firebox 26 is supported along its entire width by the transverse members 21, 20. A plurality of bolts 48 extending upwardly from the transverse members 21, 20 are used to secure the firebox 27 to the transverse members 21, 20. Similar structural configurations utilized to secure the base of firebox are disclosed in U.S. Pat. Nos. 5,072,718, 4,955,358, and 5,452,707.

Conventional barbecue grill assemblies suffer from a number of problems and limitations. First, because transverse members are used to support the firebox, the size and configuration of the support frame and the firebox cannot be altered. This limitation negatively affects the versatility of the barbecue grill assembly. Also, the multiple fasteners or bolts used to form the frame assembly can loosen over time causing a reduction in the structural rigidity of the frame assembly. Similarly, the multiple fasteners used to connect the firebox to the transverse member of the support can loosen causing the firebox to become dislodged. In addition, the fasteners require additional assembly time which increases the costs of fabricating the barbecue grill assembly. Lastly, the drilling of holes in the base of the firebox provides a pathway for water seepage and results in unwanted and premature corrosion of the firebox.

Therefore, there is a definite need for a barbecue grill assembly with a firebox that is supported in a manner that does not require engagement with the transverse frame member or a transverse structural element. Also, there is a measurable need for a manner of mounting the firebox that increases the structural rigidity of the barbecue grill assembly. There is a substantial need for pre-fabricated or pre-welded support frame assemblies that do not require the time consuming construction necessitated by fasteners or bolts. In addition, there is tangible need for a barbecue grill assembly with a cooking chamber and support frame that have an alterable configuration. This aspect significantly increases the utility of the barbecue grill assembly and allows it to function as a highly versatile platform with many different manufacturing configurations. The present invention is provided to solve these and other problems.

SUMMARY OF THE INVENTION

The present invention relates to a barbecue grill assembly. More specifically, the present invention relates to a barbecue grill assembly having a cooking chamber and a support frame assembly. The support frame assembly is adapted to provide support to the cooking chamber. The barbecue grill assembly further includes an auxiliary burner, collapsible work surfaces, and a fixed work surface. A control panel is removably secured to a front portion of the cooking chamber. A pair of doors are operably connected to the support frame assembly. The support frame assembly may include a rear panel wherein the doors and the rear panel enclose the support frame assembly to define a cabinet.

The cooking chamber includes a cover hingeably connected to a firebox. The cover includes a top wall, a rear wall, a curved or sloped front wall, and a pair of end walls. The firebox includes a pair of opposed end walls. A receptacle of the end wall is adapted to engage and support a portion of the control panel. The control panel is operably connected to a removable burner assembly positioned within the firebox. An opening in a front wall of the firebox is adapted to removably receive the burner assembly.

Each end wall includes a mounting assembly comprising a ledge or support member adapted to engage a limited portion of the support frame assembly. The support member extends generally perpendicular to an outer surface of the end wall. At a proximal end of the support member, a first wall depends therefrom. Similarly, at a distal end of the support member, a second wall depends therefrom. At least one rib or spacer depends from the support member. The ribs are spaced between the first and second walls. Each end wall further includes a first elongated member and a second elongated member that define a channel adapted to receive and secure conduit, wiring, and/or fuel lines.

In further accord with the invention, the support frame assembly is adapted to support the cooking chamber by engaging a limited portion of the firebox. The front frame member has a generally vertical component and a generally horizontal component. Similarly, the rear frame member has a generally vertical component and a generally horizontal component. The horizontal component and the vertical component, are positioned to define an angle 0. A corner region is defined at the point where the vertical frame component meets the horizontal frame component. A pair of casters are connected to a lower portion of the vertical components of the left frame assembly. A pair of wheels are connected to a lower portion of the vertical components of the right frame assembly.

As previously stated, the front and rear frame assemblies are connected by the side panel. An upper portion of the side panel is rolled or folded to create an upper surface. The upper surface of the side panel is positioned below the upper surface of the corner region. Consequently, there is a notched or stepped relationship between the upper surface and the corner region. Alternatively, the side panel is omitted and at least one transverse frame member is implemented to join the front and rear frame members and form the left and/or right frame assemblies.

The firebox of the cooking chamber is connected to the support frame assembly to define an assembled position. In the assembled position, the mounting assembly engages only an extent of the front and rear frame members. Specifically, a portion of the lower surface of the support ledge engages an extent of the front and rear frame members. No portion of the ledge engages or makes contact with the side panel, including its upper surface, or any transverse support member. In addition, in the assembled position, the first wall engages a portion of the front frame member. Furthermore, in the assembled position, the second wall engages a portion of the rear frame member. In the assembled position, the cooking chamber is vertically and horizontally supported by only a limited portion of the support frame assembly. This is contrary to conventional barbecue grill assemblies which utilize numerous frame members and frame components to support the cooking chamber.

In further accord with the invention, the auxiliary burner assembly is adapted for simple insertion with the support frame assembly. A trim piece is connected to one end of the support frames opposite the side panel. The combination of the trim piece, upper surface, front horizontal frame member, and rear horizontal frame member defines a perimeter for receiving the auxiliary burner assembly. The auxiliary burner assembly has a cover hingeably connected to a base. A burner ring is supported by the base and is positioned above the burner element. A first flange depends from a front portion of the base and a second flange depends from a rear portion of the base. A clip or retaining member adapted to secure the auxiliary burner assembly in the frame assembly is positioned adjacent the base. The retaining member has a first, generally linear portion and a second, generally curvilinear portion. The curvilinear portion is configured to engage a lower surface of the trim piece when the auxiliary burner assembly is fully engaged with the support frame assembly.

When the auxiliary burner assembly is installed in the frame assembly, the first flange engages and/or overlaps an outer surface of the horizontal frame component; the second flange engages and/or overlaps an outer surface of the horizontal frame component; and the retaining member engages a portion of the trim piece.

In contrast to conventional devices, the barbecue grill assembly can be fabricated in a variety of configurations during the assembly process. As a result, the barbecue grill assembly is modularly adjustable during the assembly process. This means that the configuration and dimensions of the cooking chamber and the support frame assembly can be altered or varied to increase the versatility of the barbecue grill assembly. However, the alteration does not affect the visual or aesthetic appearance of the barbecue grill assembly including the cooking chamber.

Other features and advantages of the invention will be apparent from the following specification taken in conjunction with the following drawings.

Figure 1:
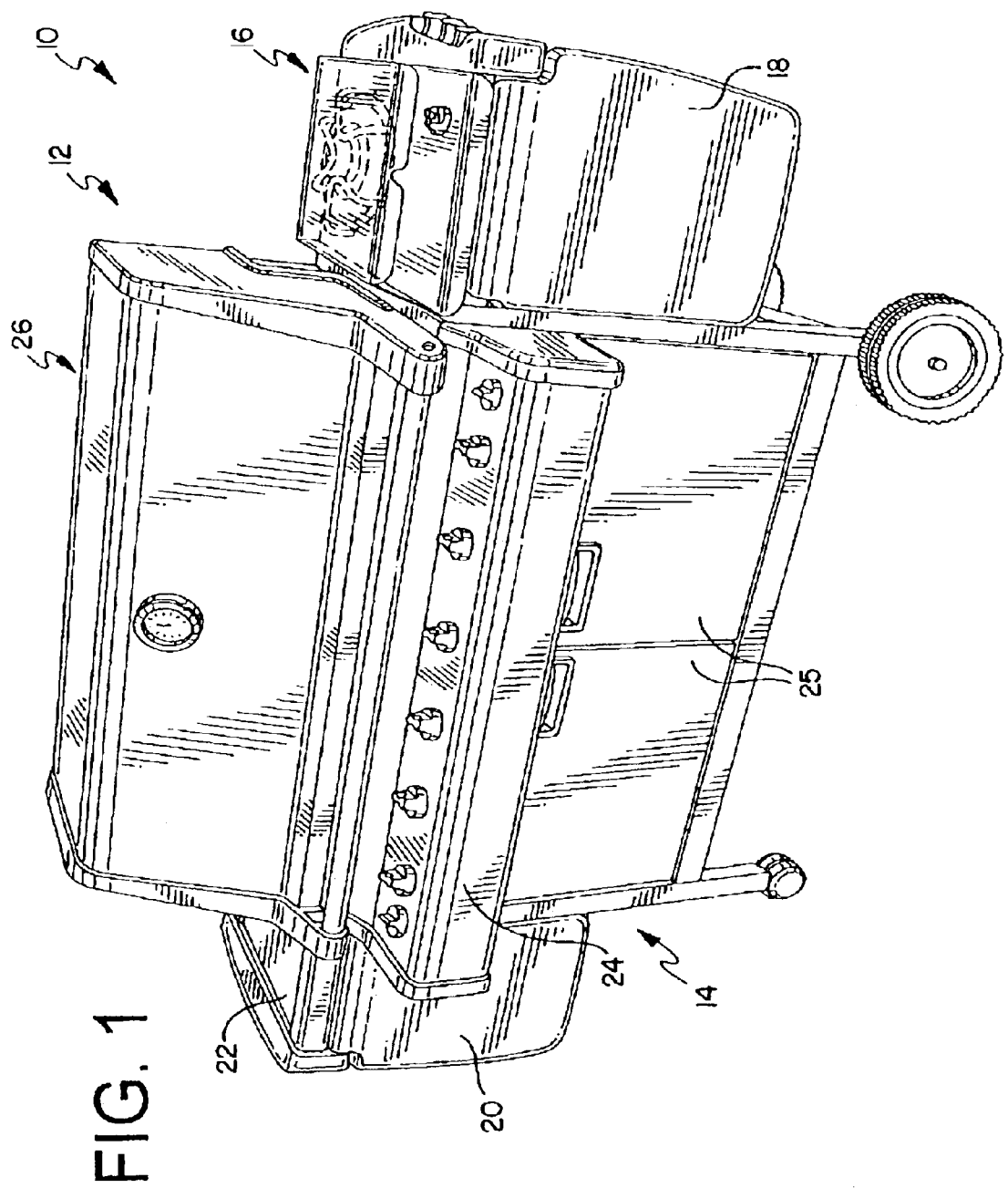
FIG. 1 is a perspective view of a barbecue grill assembly of the invention.

DETAILED DESCRIPTION OF THE INVENTION:

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

A barbecue grill assembly 10 is shown in FIG. 1. The barbecue grill assembly 10 generally includes a cooking chamber 12 and a support frame assembly 14. The frame assembly 14 is configured to provide support to the cooking chamber 12. The barbecue grill assembly 10 further includes an auxiliary burner 16, collapsible work surfaces 18, 20, and a fixed work surface 22. A control panel 24 is removably secured to a front portion of the cooking chamber 12. A pair of doors 25 are operably connected to the support frame assembly 14. The support frame assembly 14 may include a rear panel (not shown) wherein the doors and the rear panel enclose the support frame assembly 14 to define a cabinet. The bottom wall 128 (see FIG. 5), the doors, and the rear panel can be fabricated from sheet metal or plastic suitable for use in high temperature applications.

Figure 2:
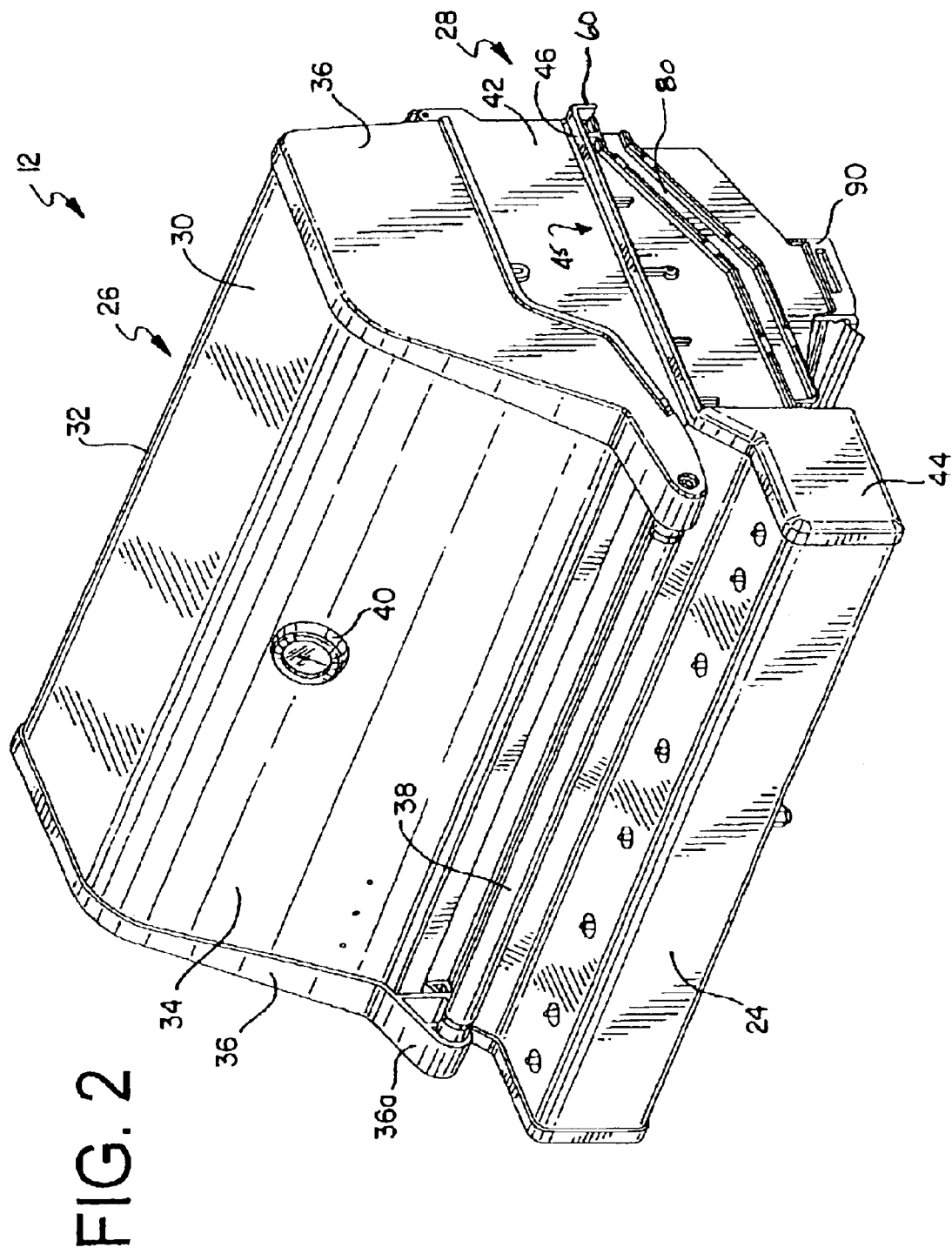
FIG. 2 is a perspective view of a cooking chamber of the barbecue grill assembly of FIG. 1.

Referring to FIG. 2, the cooking chamber 12 includes a top or cover 26 hingeably connected to a base or firebox 28. The cover 26 includes a top wall 30, a rear wall 32, a curved or sloped front wall 34, and a pair of side or end walls 36. Preferably, the end walls 36 are cast from aluminum. A generally cylindrical handle 38 is positioned between a front portion 36a of the end walls 36. A temperature gauge or indicator 40 is positioned in the front wall 34. The firebox 28 includes a pair of opposed side or end walls 42. Preferably, the end walls 42 are cast from aluminum. A receptacle 44 of the end wall 42 is configured to engage and support a portion of the control panel 24. The control panel 24 is operably connected to a removable burner assembly (not shown) positioned within the firebox 28. Preferably, the burner assembly comprises at least one elongated burner element that is oriented in a front-to-back configuration. An opening in a front wall (not shown) of the firebox 28 is configured to removably receive the burner assembly. The firebox 28 further includes a first and second bottom wall (not shown) spaced a distance apart to define an drain opening for the drainage of grease and byproducts generated during the operation of the barbecue grill assembly 10.

Figure 3:
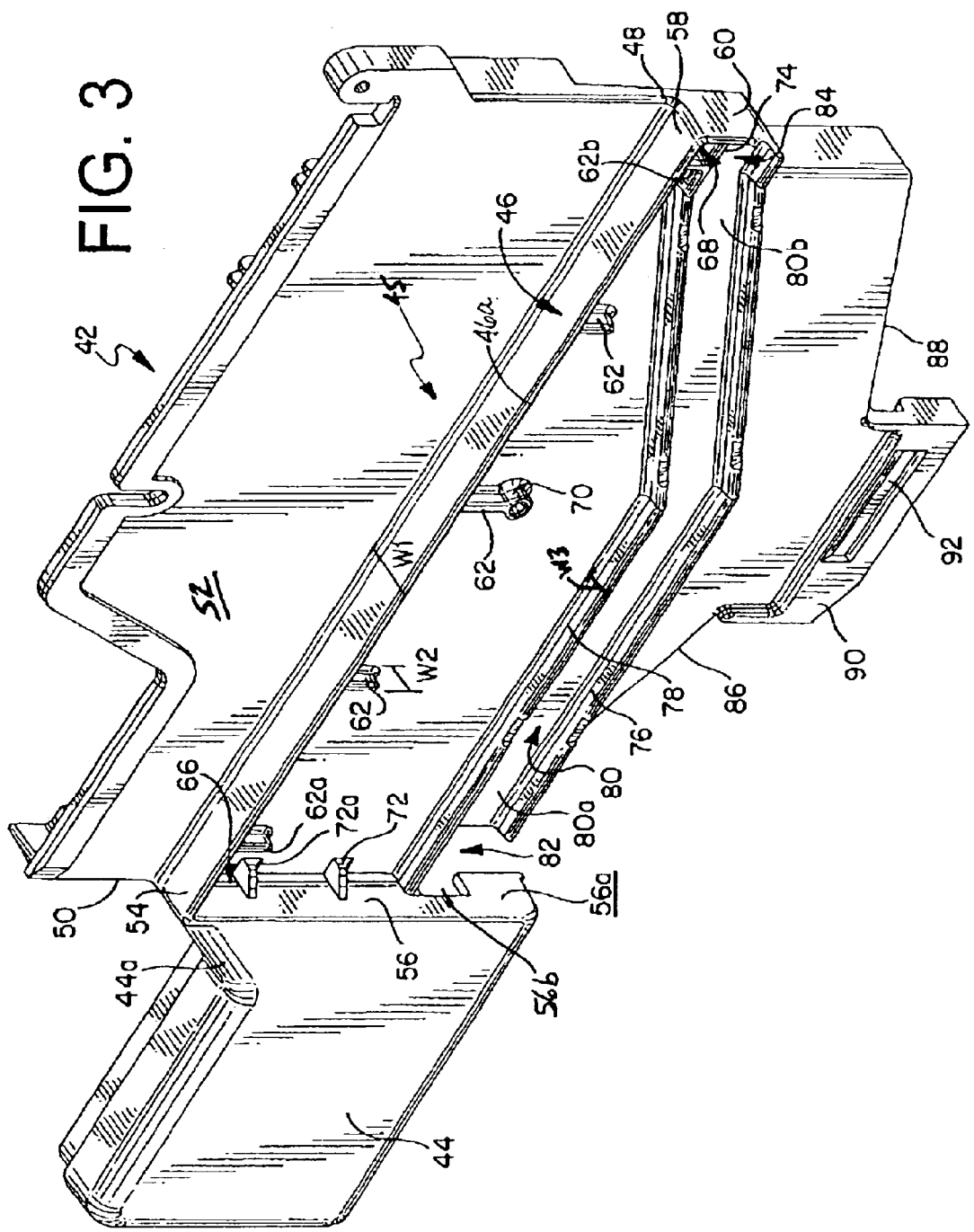
FIG. 3 is a perspective view of a right end wall of the cooking chamber of FIG. 2.
Figure 4:
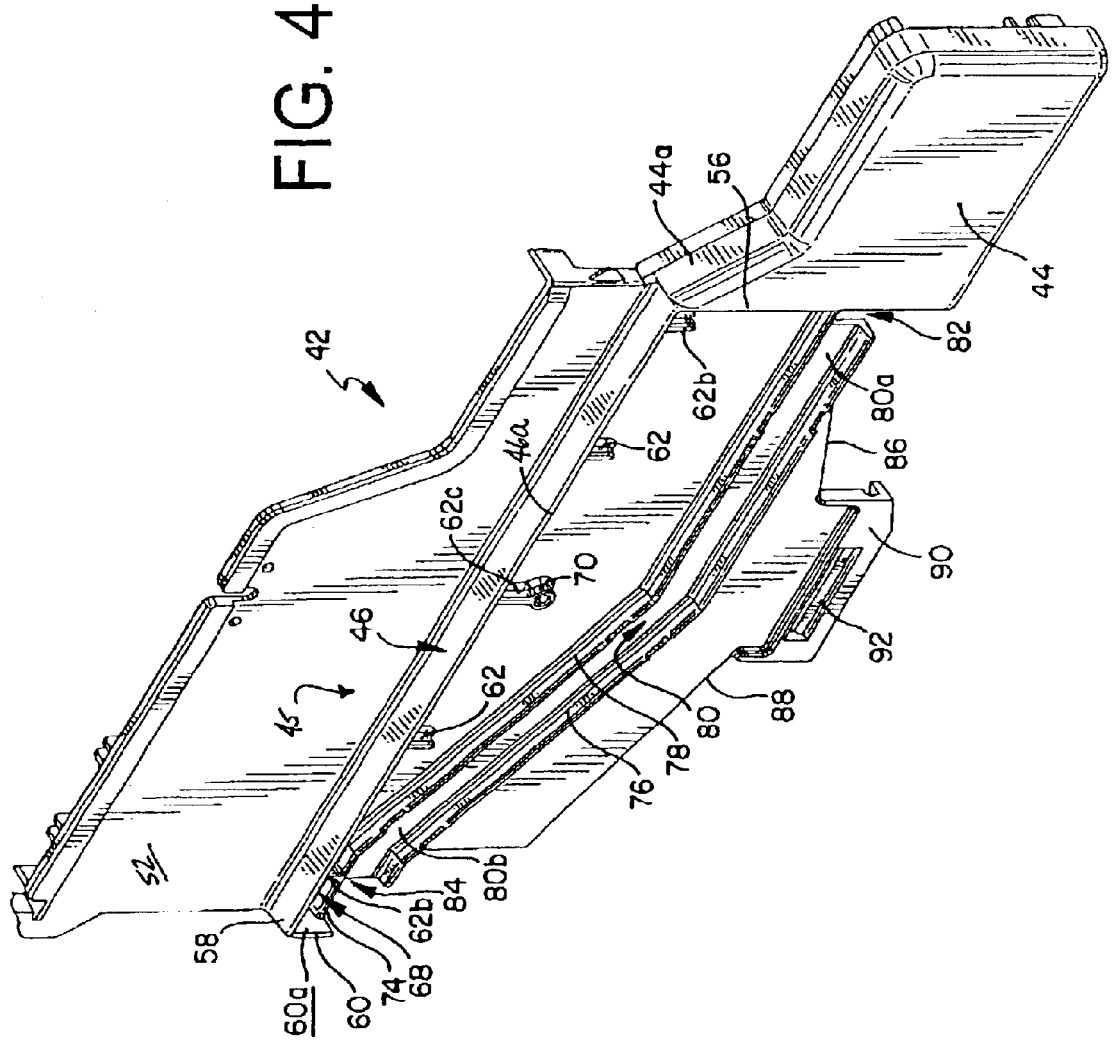
FIG. 4 is a perspective view of a left end wall of the cooking chamber of FIG. 2.

Each end wall 42 includes a mounting assembly 45 that engages a limited portion of the frame assembly 14 to support the cooking chamber 12 thereon. Unlike conventional designs, the mounting assembly 45 does not engage longitudinal members of the frame assembly 14 to support the cooking chamber 12. The mounting assembly 45 comprises a ledge or support member 46 configured to engage a portion of the support frame assembly 14. As shown in FIGS. 3 and 4, the ledge 46 extends generally perpendicular to an outer surface 52 of the end wall 42, however, the ledge 46 can extend at angle either less than or greater than 90 degrees. The outer surface 52 of the end wall 42 defines a first plane from which the ledge 46 extends. As a result, an outer surface 46a (see FIGS. 3 and 4) defines a second plane that is not in planar alignment with the first plane. Preferably, the outer surface 52 of the end wall 42 defines a single plane, meaning that it does not have distinct, elevated components which would define multiple planes of the end wall 42. The ledge 46 spans the area between a sloped portion 44a of the receptacle 44 and the rear edge 48 of the end wall 42. Described in a different manner, the ledge 46 extends between an intermediate position 50 near the receptacle 44 and the rear edge 48. Although the ledge 46 is shown as a continuous structure, the ledge 46 can have a discontinuous or segmented configuration. The dimensions of the ledge 46, including its length and width W1, vary with the design parameters of the barbecue grill assembly 10.

The mounting assembly 45 also comprises a first wall 56 that depends from a proximal end 54 of the ledge 46. The first wall 56 has an inner surface 56a and a notch 56b. The mounting assembly 45 further comprises a second wall 60 depending from a distal end 58 of the ledge 46. The width of the first and second walls 56, 60 is generally equal to the width W1 of the ledge 46, which can range from roughly 0.5–3.0 inches. The first and second walls 56, 60 are configured to prevent undesired movement of the cooking chamber 12 in the generally fore and aft direction. As explained in greater detail below, the limited interaction between the mounting assembly 45 and the support frame assembly 14 provides stability and support for the cooking chamber 12 and prevents undesired movement of the cooking chamber 12.

The mounting assembly 45 further comprises at least one vertical rib 62 that depends from the ledge 46. As shown in FIGS. 3 and 4, the vertical ribs 62 are positioned between the first and second walls 56, 60. The width W2 of the ribs 62 is generally less than the width W1 of the ledge 46. As a result, there is notched or stepped configuration between the ribs 62 and the ledge 46. A first rib 62a is positioned near the proximal end 54 and a second rib 62b is positioned near the distal end 58. An intermediate rib 62c has a boss 70 configured to receive a fastener. At least one horizontal rib 72 is positioned adjacent the first wall 56 to increase the structural rigidity of the first wall 56. Similarly, a horizontal rib 74 is positioned near the second wall 60. The vertical and horizontal ribs 62, 72 are configured to ensure proper spacing between the support frame assembly 14 and the cooking chamber 12. Thus, the ribs 62, 72 act as spacers or set offs to minimize direct contact between components of the support frame assembly 14 and the end wall 42 of the firebox 28 when the grill assembly 10 is in the assembled position.

Near the proximal end 54, the first wall 56 and the ledge 46 intersect to define a first receiver 66. Near the distal end 58, the second wall 60 and the ledge 46 intersect to define a second receiver 68. In general terms and as explained below, the first and second receivers 66, 68 are configured to receive and/or engage a limited portion of the support frame assembly 14.

Referring to FIGS. 2–4, the end wall 42 further includes a first elongated member or rail 76 and a second elongated member or rail 78. The elongated members 76, 78 define a channel 80 configured to receive and secure conduit, including wiring, fuel lines, and/or thermocouples. A first opening 82 is positioned adjacent a first end 80a of the channel 80. Similarly, a second opening 84 is positioned adjacent a second end 80b of the channel 80. In this manner, a fuel line or wiring can be secured within the channel 80 and extend from the rear edge 48 of the end wall 42 through the first opening 82 and to a fuel manifold (not shown) in the control panel 24. Preferably, the channel 80 spans the distance between the first wall 56 and the second wall 60. Alternatively, the channel 80 originates and/or terminates between either of the first and second walls 56, 60 causing the openings 82, 84 to be positioned adjacent the first and second wall 56, 60 respectively. The channel 80 is shown being positioned below the mounting assembly 45, however, it can be positioned above or adjacent to the mounting assembly 45. The members 76, 78 of the channel 80 have a width W3 that is generally equivalent to the width W2 of the ribs 62. Although the channel 80 is depicted as having an angled configuration, it can have a linear or curvilinear configuration depending upon the design parameters of the cooking chamber 12.

Figure 7:
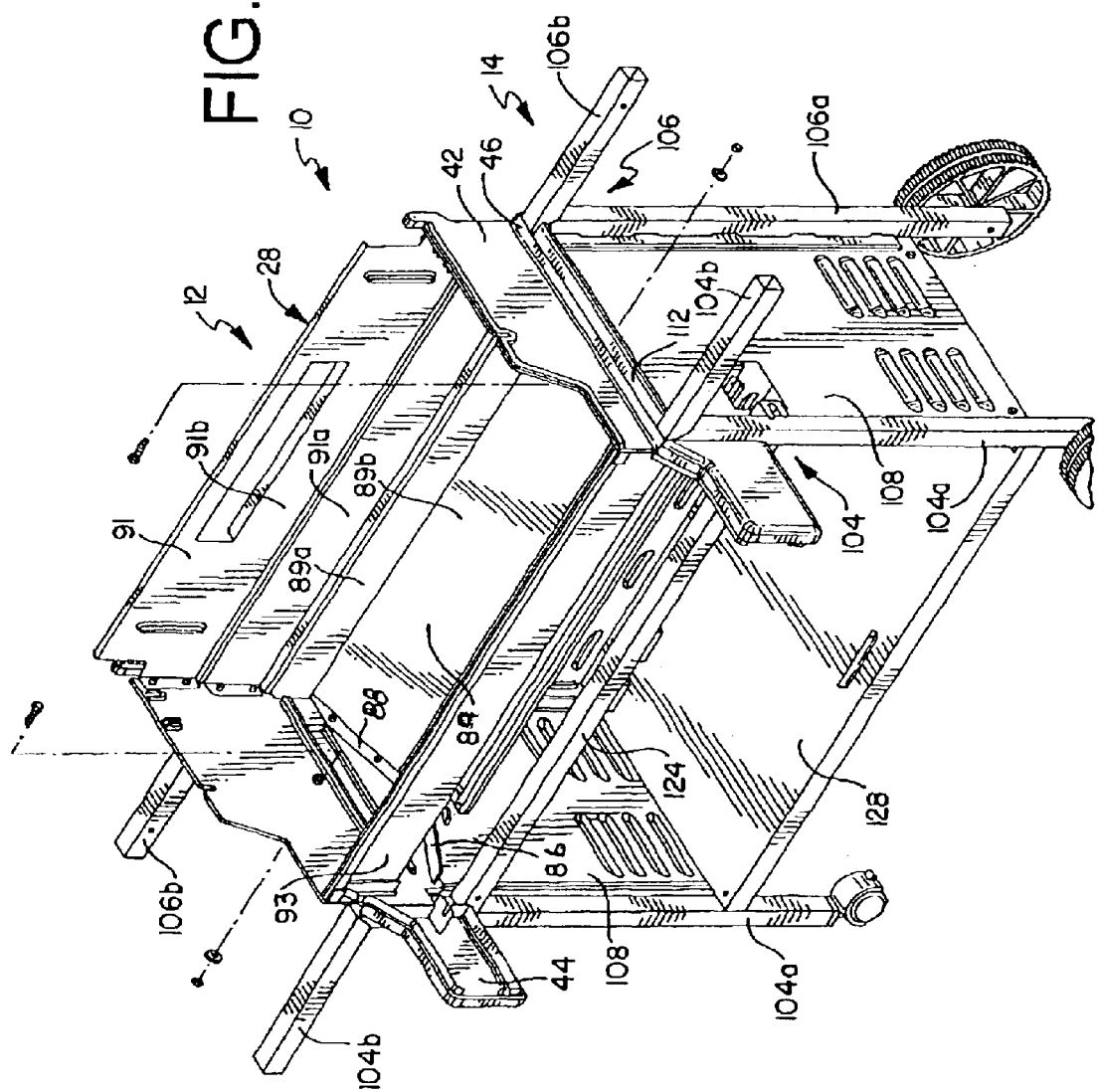
FIG. 7 is a perspective view of the cooking chamber and the support frame assembly of the barbecue grill assembly of FIG. 1.

Each end wall 42 has a first bottom wall component 86 and a second bottom wall component 88. A pair of bottoms walls 89 are cooperatively positioned with the wall components 86, 88 to form a bottom component of the cooking chamber 12. Referring to FIG. 7, the rear bottom wall 89 has a sloped first portion 89a and a generally vertical second portion 89b. As mentioned above, the first and second bottom walls 87, 89 are spaced a distance apart to define an opening for the drainage of grease and byproducts generated during the operation of the barbecue grill assembly 10. The first and second wall components 86, 88 are sloped to correspond with the first and second bottom walls 87, 89 thereby facilitating the migration of grease and byproducts to the drain opening. A removable drain tray (not shown) is operably supported by tray support structure 90 positioned between the first and second wall components 86, 88. The support structure 90 has an aperture 92 configured to permit the insertion and removal of the drain tray. A rear wall 91 (see FIG. 7) is positioned between and secured to a rear portion of the end walls 42. The rear wall 91 has a lower portion 91a and an upper portion 91b with an aperture configured to receive a heating element, for example an infrared burner. A front wall 93 (see FIG. 7) is positioned between and secured to a front portion of the end walls 42. The first and second bottom walls 87, 89, the rear wall 91, and the front wall 93 each have a length L. In addition, the first and second bottom walls 87, 89, the rear wall 91, and the front wall 93 are secured to the end walls 42 with fasteners.

Figure 5:
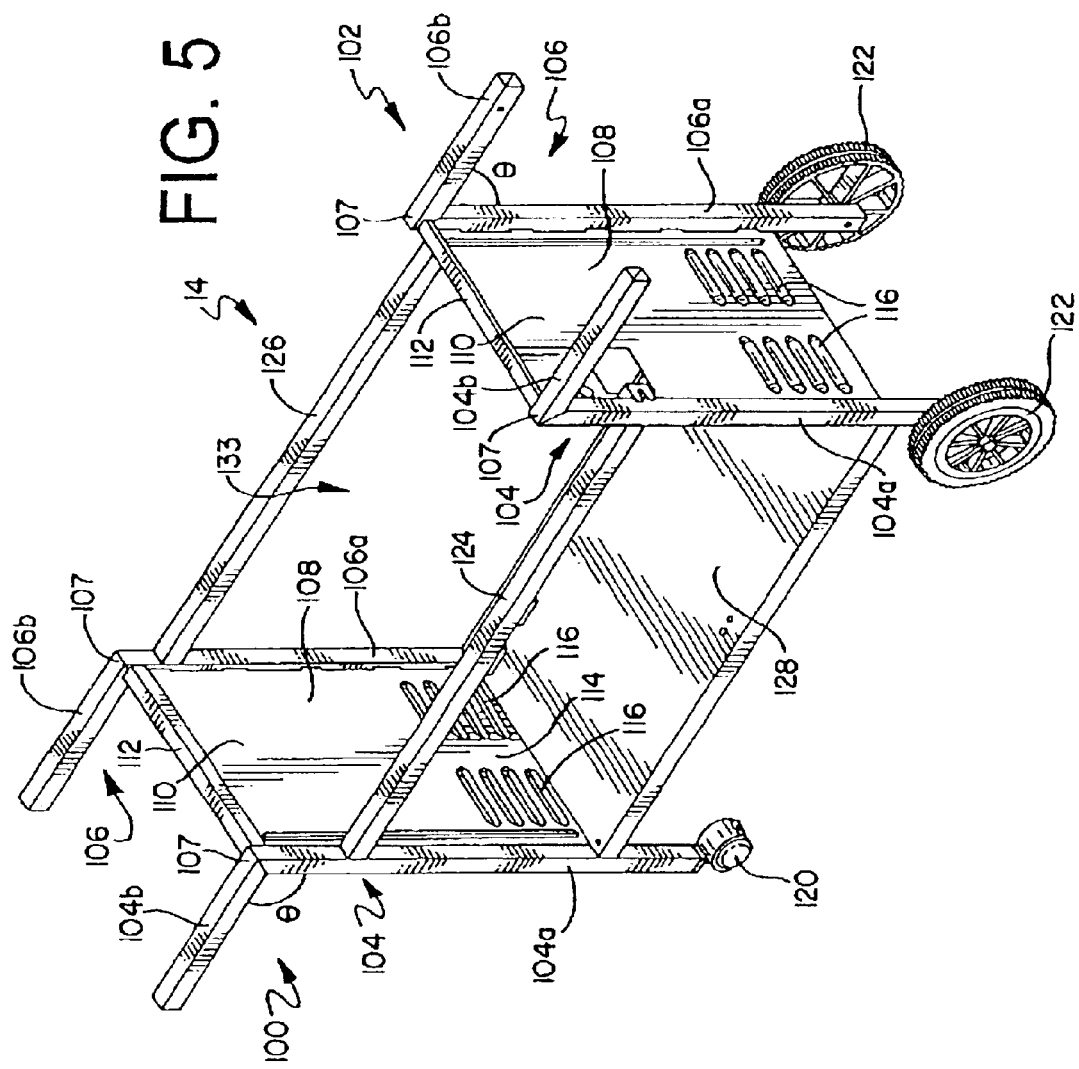
FIG. 5 is a perspective view of a support frame assembly of the barbecue grill assembly of FIG. 1.
Figure 6:
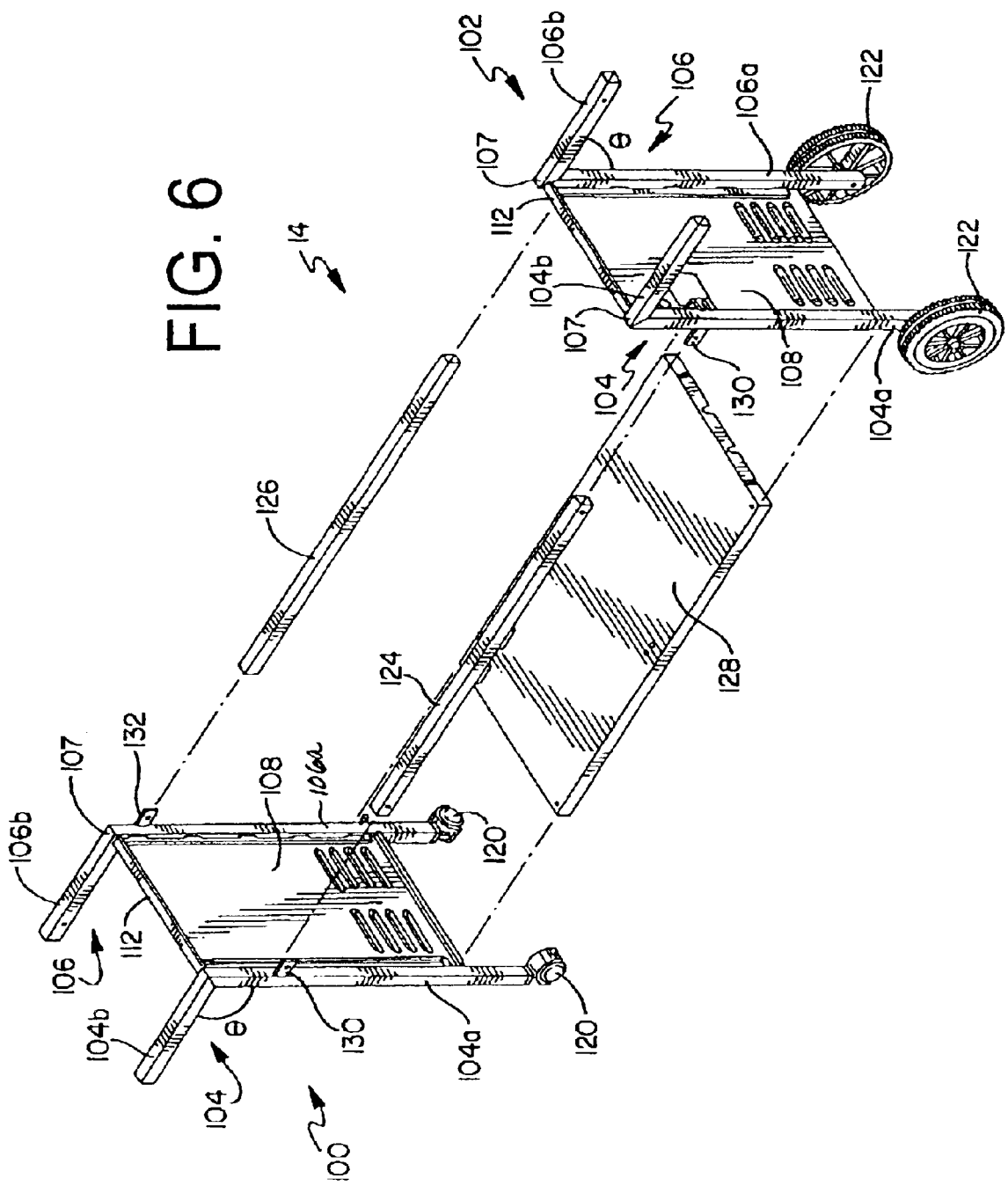
FIG. 6 is an exploded perspective view of the support frame assembly of the barbecue grill assembly of FIG. 1.

Referring to FIGS. 5 and 6, the support frame assembly 14 is configured to support the cooking chamber 12 by engaging a limited portion of the firebox 28, namely the mounting assembly 45. In general terms, the frame assembly 14 has a pre-welded left frame assembly 100 and a pre-welded right frame assembly 102. The pre-welded construction of the left and right frame assemblies 100, 102 represents a significant cost savings over conventional frame designs as measured in fabrication time, assembly time, and material costs. The pre-welded left and right assemblies 100, 102 each comprise a front frame member 104, a rear frame member 106, and a side panel 108 connecting the front and rear frame members 104, 106. Preferably, the front and rear frame members 104, 106 have a tubular configuration. The front frame member 104 has a generally vertical component or leg 104a and a generally horizontal component 104b. Similarly, the rear frame member 106 has a generally vertical component or leg 106a and a generally horizontal component 106b. The horizontal component 104b, 106b and the vertical component 104a, 106a are positioned to define an angle θ. Preferably, the angle θ is 90 degrees whereby the horizontal component 104b, 106b is perpendicular to the vertical component 104a, 106a. Preferably, the horizontal component 104b, 106b and the vertical component 104a, 106a are bent such that they are substantially perpendicular. Alternatively, the horizontal component 104b, 106b and the vertical component 104a, 106a are welded such that they are substantially perpendicular.

The support frame assembly 14 has a plurality of corner regions 107 wherein each results from the intersection or mating of the vertical frame component 104a, 106a and the horizontal frame component 104b, 106b. The left and right frame assemblies 100, 102 each have a pair of corner regions 107—where the front vertical frame component 104a meets the front horizontal frame component 104b and where the rear vertical frame component 106a meets the front horizontal frame component 106b. Preferably, the horizontal components 104b, 106b and the vertical components 104a, 106a are tubular and have a constant width W4 (see FIG. 8). Thus, the corner region 107 is a six-sided or cube-shaped region with dimensions consistent with the width W4 of the components. A pair of casters 120 are connected to a lower portion of the vertical components 104a, 106a of the left frame assembly 100. A pair of wheels 122 are connected to a lower portion of the vertical components 104a, 106a of the right frame assembly 102. As mentioned above, the front and rear frame assemblies 104, 106 are connected by the side panel 108. The side panel 108 can be fabricated from sheet metal or plastic suitable for use in high temperature applications. Preferably, an upper portion 110 of the side panel 108 is rolled or folded to create an upper surface 112. The upper surface 112 has a rolled exterior edge 112a (see FIGS. 8 and 9). A lower portion 114 of the side panel 108 has a plurality of slotted openings 116. Referring to FIGS. 5 and 6, the upper surface 112 of the side panel 108 is positioned below the upper surface of the corner region 107. Consequently, there is a notched or stepped relationship between the upper surface 112 and the corner region 107. Described in a different manner and referring to FIG. 8, the upper surface 112 of the side panel 108 is not in planar alignment with upper surface 107a of the corner region 107. Alternatively, the dimensions of the side panel 108 is increased to remove the notched or stepped relationship. In yet another alternative, the side panel 108 is omitted and at least one transverse frame member (not shown) is implemented to join the front and rear frame members 104, 106 and form the left and/or right frame assemblies 100, 102.

The support frame assembly 14 further includes a first horizontal frame member 124, a second horizontal frame member 126, and a bottom wall or panel 128. The first horizontal frame member 124, the second horizontal frame member 126, and the bottom wall 128 each have a length L. The first horizontal frame member 124 connects the front frame members 104 of the left and right frame assemblies 100, 102. Preferably, the first horizontal frame member 124 couples the front vertical components 104a of the left and right frame assemblies 100, 102. As shown in FIG. 6, a bracket 130 mounted to the front frame members 104 is configured to secure the first horizontal frame member 124 in a position below the upper surface 112. Described in a different manner, the first horizontal frame member 124 is secured to the front frame members 104 beneath the horizontal components 104b. Similarly, the second horizontal frame member 126 connects the rear vertical components 106a of the left and right frame assemblies 100, 102. A bracket 132 mounted to the rear frame members 106 is configured to secure the second horizontal frame member 126 in a position below the upper surface 112. However, the second horizontal frame member 126 is preferably secured in position vertically higher than the secured first horizontal frame member 124. Referring to FIG. 5, the first and second horizontal frame members 124, 126 and the left and right frame assemblies 100, 102 define a bay 133 configured to receive a portion of the cooking chamber 12. However, only a limited portion of the support frame assembly 14 engages and supports the cooking chamber 12 when it is received by the bay 133. Although shown as having a generally rectangular configuration, the configuration of the bay 133 varies with the design parameters of the barbecue grill assembly 10.

Figure 8:
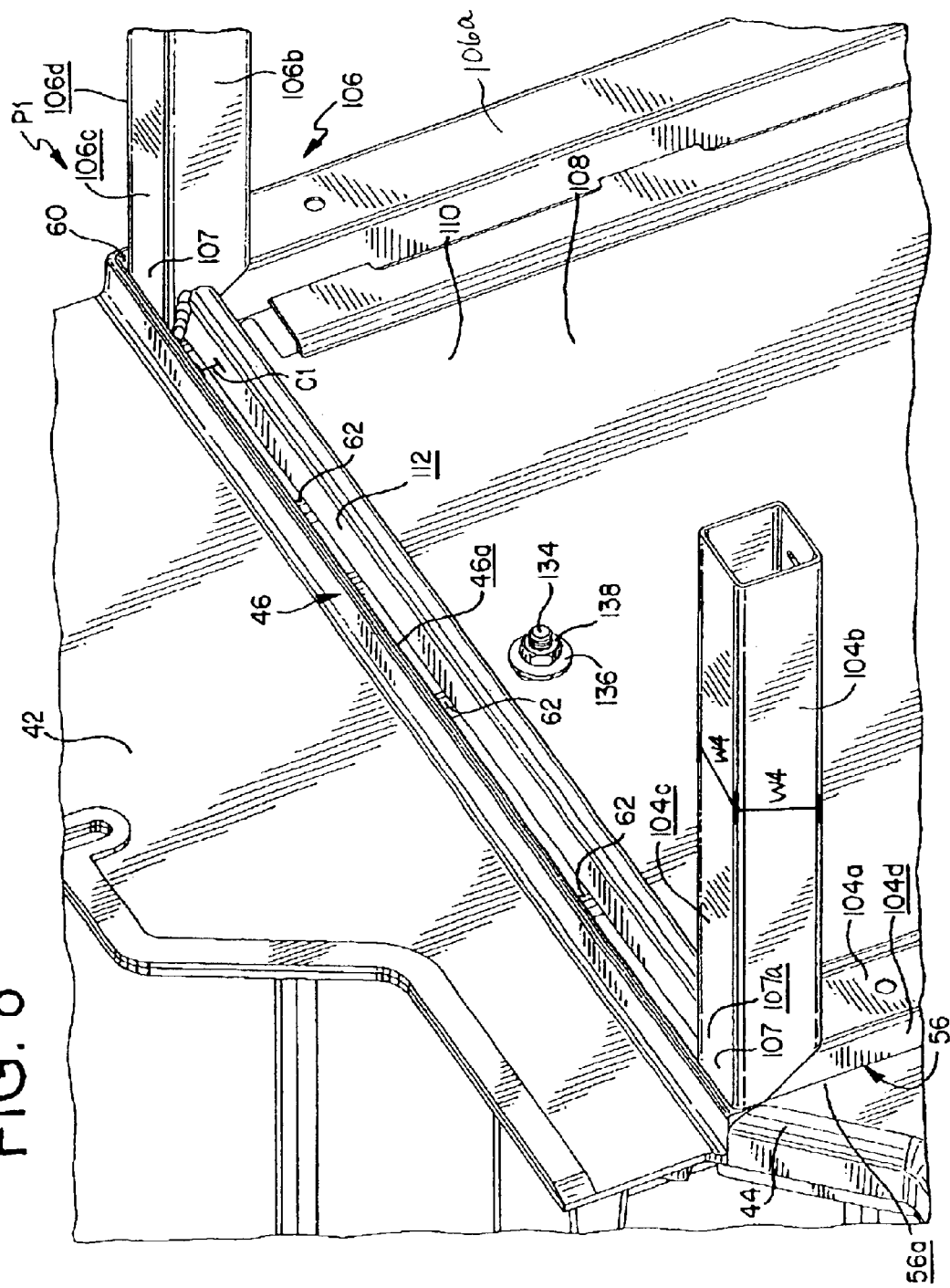
FIG. 8 is a perspective view of the cooking chamber and the support frame assembly of the barbecue grill assembly of FIG. 1, showing the engagement between the cooking chamber and the support frame assembly.

Referring to FIGS. 7 and 8, the firebox 28 of the cooking chamber 12 is shown connected to the support frame assembly 14 to define an assembled position P1. The work surfaces 18, 20, 22, the doors 25, and the top 26 of the cooking chamber 12 have been removed from FIGS. 7 and 8. In the assembled position P1, the mounting assembly 45 engages a limited extent of the front and rear frame members 104, 106 to support the cooking chamber 12. Specifically, a portion of the outer surface 46a of the ledge 46 engages an extent of the front and rear frame members 104, 106 to provide vertical support to the cooking chamber 12. Preferably, the ledge 46 engages an upper surface 104c of the front frame member 104 and an upper surface 106c of the rear frame member 106. In this manner, the outer surface 46a of the ledge 46 comes into contact with an extent of the upper surfaces 104c, 106c. This positional relationship is analogous to the support provided by a column, were an upper surface of the column is used to support an object. Here, the frame members 104a, 106a represent the column and the ledge 46 and the firebox 28 are the supported objects.

In the assembled position P1, the first wall 56 engages a portion of the front frame member 104. As a result, a portion of an inner surface 56a of the first wall 56 engages or comes into contact with an extent of an outer surface 104d of the front frame member 104. Furthermore, in the assembled position P1, the second wall 60 engages a portion of the rear frame member 106. As a result, a portion of an inner surface 60a engages or comes into contact with an extent of an outer surface 106d of the rear frame member 106. The interaction between the first and second walls 56, 60 and the frame members 104, 106 provides fore and aft support to the cooking chamber 12. The degree or amount of engagement between the walls 56, 60 and the respective outer surfaces 104d, 106d depends upon a number of factors, including but not limited to the length and width of the walls 56, 60. Preferably, the ledge 46, the first wall 56, and the second wall 60 do not engage, contact, or overlap the inner surfaces of the front and rear frame members 104, 106 or the side panel 108.

In the assembled position P1, a portion of the mounting assembly 45 engages an extent of the corner regions 107.

This means that the ledge 46 and the first wall 56 engage a portion of the corner region 107 of the front frame member 104, while the ledge 46 and the second wall 60 engage a portion of the corner region 107 of the rear frame member 106. Preferably, an extent of a lower surface of the ledge 46 engages the corner regions 107 of the front and rear frame members 104, 106. In the assembled position P1, the first receiver 66 receives an extent of the front frame member 104. Described in a different manner, the first receiver 66 receives a portion of the corner region 107 of the front frame member 104. Similarly, in the assembled position P1, the second receiver 68 receives an extent of the rear frame member 106. Described in a different manner, the second receiver 68 receives a portion of the corner region 107 of the rear frame member 106.

In the assembled position P1, the ribs 62 make contact with an internal portion of the side panel 108. The first rib 62a is positioned near the front frame member 104, while the second rib 62b is positioned near the rear frame member 106. Also, the protrusions 72 can be configured to make contact with the front frame member 104. The interaction between the ribs 62 and the side panel 108 provide a set-off for the firebox 28 thereby ensuring the proper positioning of the cooking chamber 12. The degree or amount of set-off is a function of a number of grill assembly 10 design parameters, including but not limited to the ledge width W1 and the rib width W2. In addition, the amount of engage or overlap between the mounting assembly 45 varies with the ledge width W1 and the rib width W2. As a result of the set-off and the dimensioning of the mounting assembly 45 and side panel 108, a slot or clearance C1 is formed between the upper surface 112 of the side panel 108 and the ledge 46. The clearance C1 results from the fact that ledge 46 only engages an extent of the front and rear frame members 104, 106 and does not engage the side panel 108 or its upper surface 112. Described in a different manner, there is a generally rectangular gap between the upper surface 112 and the ledge 46. The clearance C1 is configured to provide a vent or passageway for heat generated during operation of the barbecue grill assembly 10. Specifically, heat generated in the firebox 28 can be transferred to the environment passing through the clearance C1. Since there is minimal structural contact between the firebox 28 and the support frame 14, the clearance C1 reduces the amount of conductive heat transfer there between. The clearance C1 can be removed by increasing the dimensions of either the mounting assembly 45 or the side panel 108 such that the ledge 46 engages the side panel 108.

In the assembled position P1 of FIGS. 7 and 8, the cooking chamber 12 is supported by only a limited portion of the support frame assembly 14. This is contrary to conventional barbecue grill assemblies which utilize numerous frame members and frame components to support the cooking chamber. In the assembled position P1, the engagement between the ledge 46 and the limited extent of the support frame assembly 14 provides vertical support for the cooking chamber 12. Furthermore, the engagement between the first wall 56 and the front frame member 104, and the second wall 60 and the rear frame member 106 prevents fore and aft movement of the cooking chamber 12. In this manner, the cooking chamber 12 is stable and secure with both horizontal and vertical support, however, a fastener 134 (see FIG. 8) can be inserted through an opening 108a in the side panel 108 and the boss 70 and received by a washer 136 and nut 138 to further secure the cooking chamber 12 in the assembled position P1. In the assembled position P1, the cooking chamber 12 is positioned at an optimum height for use while minimizing the overall height of the barbecue grill assembly 10. Due to the engagement between the ledge 46 and a portion of the support frame assembly 14, the control panel 24, the handle 38, and a cooking grate (not shown) are easily accessible for use. The minimization of the overall height of the barbecue grill assembly 10 reduces the level of packaging necessitated and as a result, reduces the production and shipping costs of the of the barbecue grill assembly 10.

Figure 9:
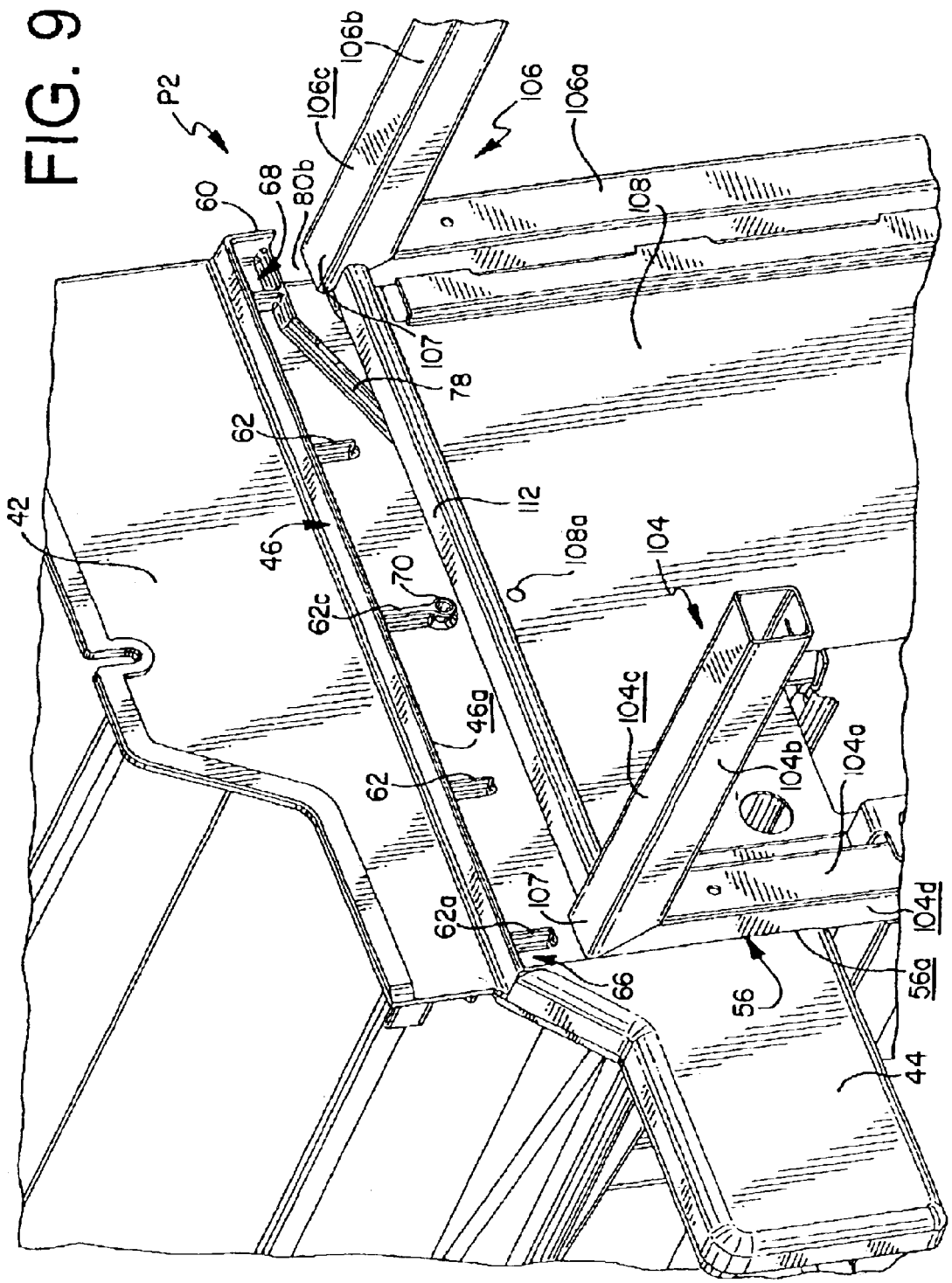
FIG. 9 is an exploded perspective view of the cooking chamber and the support frame assembly of the barbecue grill assembly of FIG. 1, showing the disengagement between the cooking chamber and the support frame assembly.

Referring to FIG. 9, the firebox 28 is positioned above the support frame assembly 14 in an elevated position P2. In the elevated position P2, the ledge 46 is not in engagement with support frame assembly 14, however, the cooperative positioning between the ledge 46, the first wall 56, and the second wall 60 and the front and rear frame members 104, 106 is evident. Described in a different manner, the ledge 46, the first wall 56, and the second wall 60 are aligned with the front and rear frame members 104, 106 to facilitate the "drop-in" insertion of the firebox 28 and/or cooking chamber 12. As a result, the barbecue grill assembly 10 can be assembled in a modular fashion that is more efficient and cheaper than conventional assembly methods.

In another preferred embodiment, the ledge 46 extends generally perpendicular to an interior surface of the end wall 42, meaning that the ledge 46 extends inward of the firebox 28. The inwardly extending ledge 46 forms a socket or channel in the end wall 42. The socket is configured to receive and/or engage an extent of the support frame assembly 14, preferably an upper surface of the frame members 104, 106, to provide vertical support for the cooking chamber 12. The socket can be elongated or a series of shorter segments. In this manner, there is a male-female engagement between the end wall 42 and a portion of the support frame assembly 14. The configuration of the socket, including its depth, varies with the configuration of the ledge 46.

Figure 10:
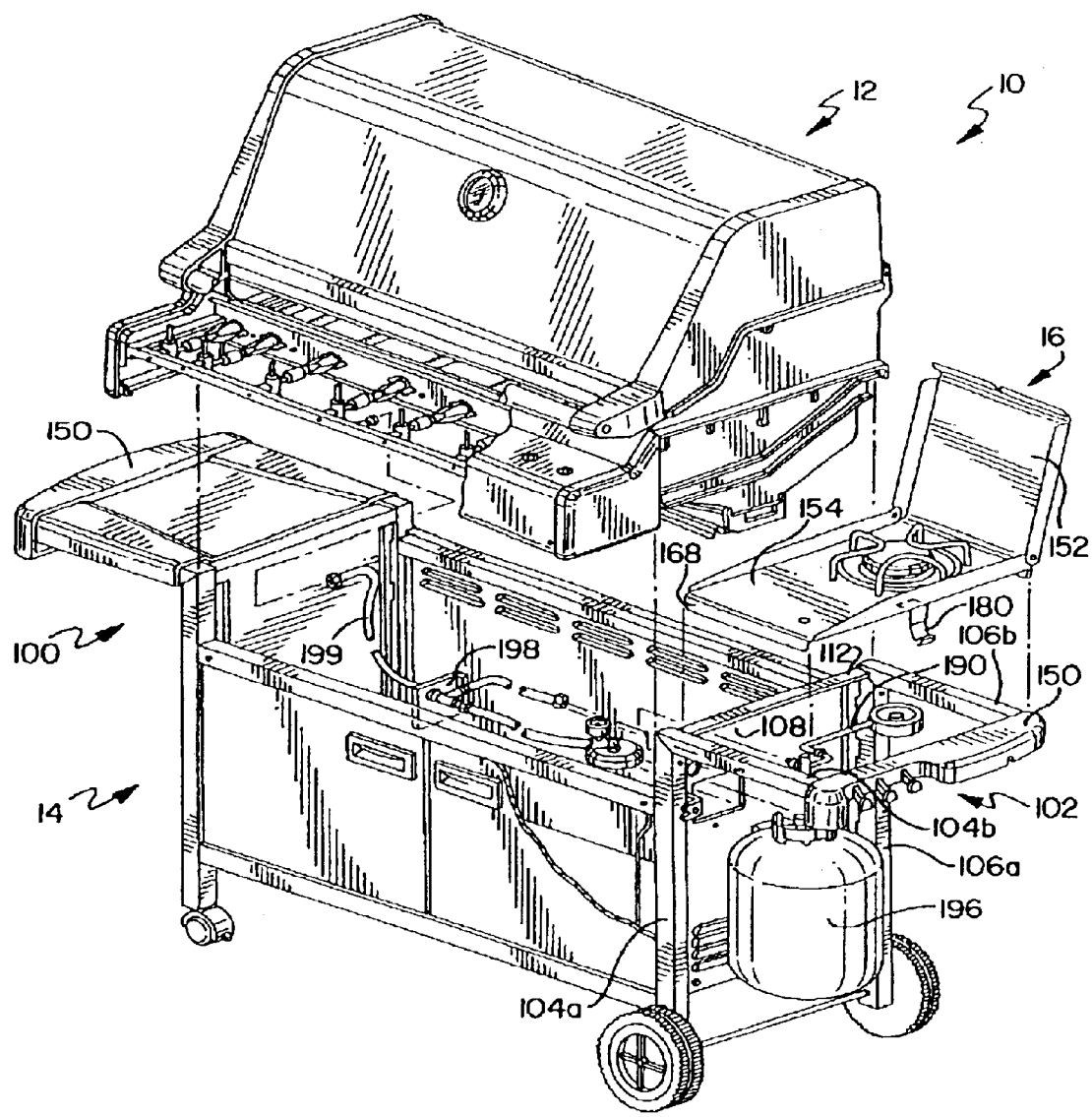
FIG. 10 is an exploded perspective view of the cooking chamber and the support frame assembly of the barbecue grill assembly of FIG. 1, showing the disengagement between the cooking chamber and an auxiliary burner assembly and the support frame assembly.

Referring to FIG. 10, the barbecue grill assembly 10 is shown in an exploded view to emphasize the modular assembly of its design. Like the cooking chamber 12, the auxiliary burner assembly 16 is configured for simple insertion with the support frame assembly 14. Although shown as being received by the right frame assembly 102, the auxiliary burner assembly 16 can be received by the left frame assembly 100. A trim piece 150 is connected to the end of the right support frame 102 opposite the side panel 108. The combination of the trim piece 150, upper surface 112, front horizontal frame member 104b, and rear horizontal frame member 106b defines a perimeter for receiving the auxiliary burner assembly 16.

Figure 11:
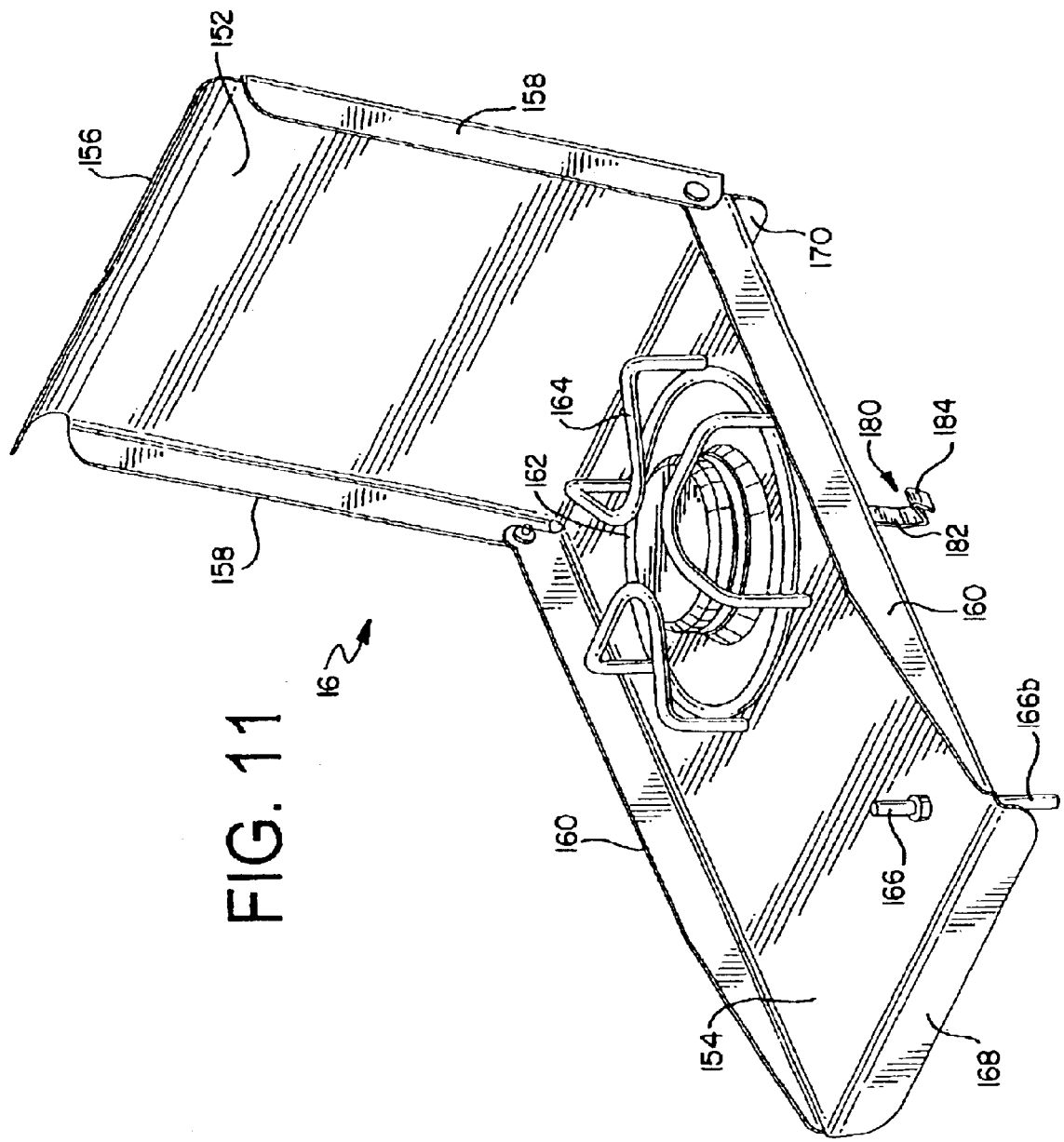
FIG. 11 is a perspective view of the auxiliary burner assembly of the of the barbecue grill assembly of FIG. 1; and, FIG. 12 is end view of the barbecue grill assembly of FIG. 1.

As shown in FIG. 11, the auxiliary burner assembly 16 has a cover 152 hingeably connected to a base 154. The cover 152 has a front lip 156 and side walls 158 that cooperate with side walls 160 of the base 154. A burner ring 164 is supported by the base 154 and is positioned above the burner element 162. The burner element 162 includes a cap, a head, and a base which depends below the base 154. A control valve 166 configured to modulate the burner element 162 extends through the base 154 wherein a lower portion 166b is positioned below the base 154. A first flange 168 depends from a front portion of the base 154 and a second flange 170 depends from a rear portion of the base 154. The first and second flanges 168, 170 extend substantially the width of the base 154. A clip or retaining member 180 configured to secure the auxiliary burner assembly 16 in the frame assembly 14 is positioned adjacent the base 154. Although the retaining member 180 is shown on the right side of the base 154, the retaining member 180 can be positioned on the left side of the base 154. Alternatively, the retaining member 180 is positioned on both the left and right sides of the base 154. The retaining member 180 has a first, generally linear portion 182 and a second, generally curvilinear portion 184. The curvilinear portion 184 is configured to engage a cleat 185 in the lower region of the trim piece 150 when the auxiliary burner assembly 16 is fully engaged with the support frame assembly 14.

When the auxiliary burner assembly 16 is installed in the frame assembly 14, the first flange 168 engages and/or overlaps an outer surface of the horizontal frame component 104*b*; the second flange 170 engages and/or overlaps an outer surface of the horizontal frame component 106*b*; and the retaining member 180 engages cleat 185. While the auxiliary burner assembly 16 is being installed, the retaining member 180 slidingly engages the cleat 185 until it clears the lower, inner edge of the trim piece 150 and engages the lower surface of the trim piece 150. As mentioned above, the auxiliary burner assembly 16 preferably includes a second retaining member 180 that engages the upper surface 112 of the side panel 108 to further secure auxiliary burner assembly 16 in an assembled position. In this manner, the retaining member 180 provides vertical support for the auxiliary burner assembly 16, while the first and second flanges 168, 170 provide fore and aft stability.

Figure 12:
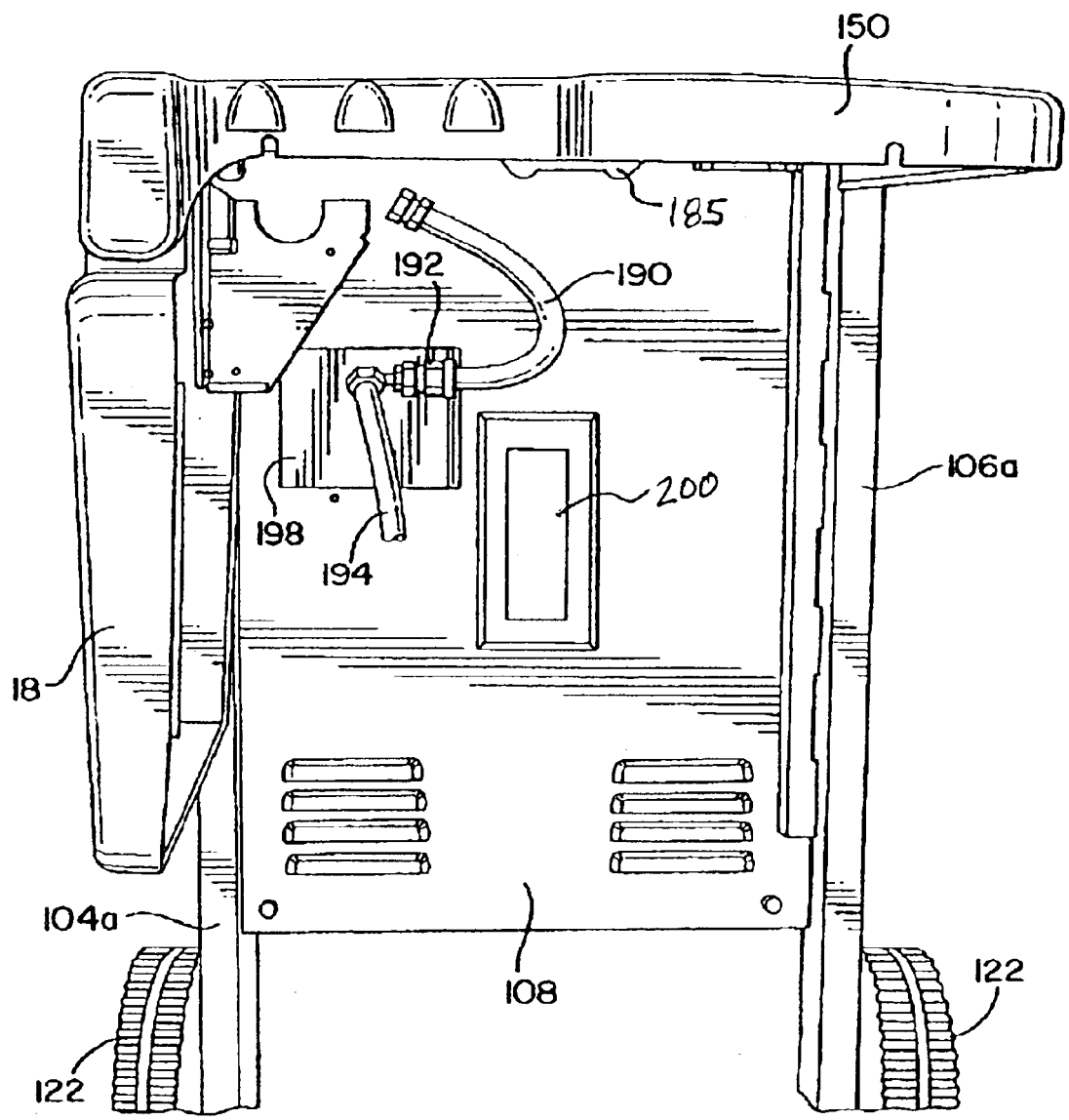

Referring to FIG. 12, an auxiliary fuel line 190 supplies combustible fuel to the auxiliary burner assembly 16. A coupler 192 connects the auxiliary fuel line 190 to the main fuel line 194 which is connected to a fuel tank 196 (see FIG. 10). An interface plate 198 is cooperatively dimensioned with an aperture in the side panel 108. Downstream of the interface plate 198, a fuel line 199 (see FIG. 10) supplies fuel to the control panel 24. A scale 200 for the fuel tank 196 is positioned near the interface plate 198.

In contrast to conventional devices, the barbecue grill assembly 10 is a highly versatile platform that can be fabricated in a variety of configurations during the assembly process. As a result, the barbecue grill assembly 10 is modularly adjustable during the assembly process. This means that the configuration and dimensions of the cooking chamber 12 and the support frame assembly 14 can be altered or varied to increase the versatility of the barbecue grill assembly 10. For example, the cooking chamber 12 has a first configuration CF1, primarily defined by a first length, wherein the cooking chamber 12 is capable of housing four burner tubes. Similarly, the support frame assembly 14 has a first configuration CF1, primarily defined by a first length, that ensures that it is capable of receiving and supporting the first configuration CF1 of the cooking chamber 12. In other words, the cooking chamber 12 and the support frame assembly 14 are cooperatively dimensioned in their first configuration CF1. The barbecue grill assembly 10 can be adjusted to a larger, second configuration to accommodate a great number of burner tubes, for example six burner tubes. To this end, the cooking chamber 12 has a second configuration CF2, primarily defined by a second length, wherein the cooking chamber 12 is capable of housing six burner tubes. Similarly, the support frame assembly 14 has a second configuration CF2, primarily defined by a second length, that ensures that it is capable of receiving and supporting the second configuration CF2 of the cooking chamber 12.

To increase the configuration of the cooking chamber 12 from its first configuration CF1 to its second configuration CF2, the length of the top wall 30/rear wall 32/front wall 34 (which are formed from a single piece of sheet metal) and the handle 38 are increased. In addition, the length of the bottom walls 89, rear wall 91, and the front wall 93 are increased. However, there is no need to increase the dimensions or configuration of the end walls 36 of the cover 26 or the end walls 42 of the firebox 28. Significantly, none of the components of the end wall 42 requires adjustment or alteration, including the receptacle 44, ledge 46, or the channel 80. In this manner, the cooking chamber 12 is modularly adjustable. To increase the configuration of the support frame assembly 14 from its first configuration CF1 to its second configuration CF2, only the length of the first and second horizontal members 124, 126 and the bottom wall 128 is increased. Significantly, none of the other components of the support frame assembly 14 require adjustment or alteration, including the left frame assembly 100 or the right frame assembly 102. In this manner, the support frame assembly 14 is modularly adjustable.

Since the cooking chamber 12 and the support frame assembly 14 are modularly adjustable, the versatility and utility of the barbecue grill assembly 10 is increased. Unlike conventional devices, the adjustability of the barbecue grill assembly 10 is accomplished through the interchanging of a minimum number of components—only the top wall 30, rear wall 32, front wall 34, handle 38, bottom walls 89, rear wall 91, the front wall 93, first and second horizontal members 124, 126, and the bottom wall 128 are affected—while holding a larger number of components constant. As a result, the adjustability of the barbecue grill assembly 10 is accomplished in an extremely efficient and cost-effective manner, as measured in material cost, assembly time, inventory levels, and labor costs.

While the specific embodiments have been illustrated and described, numerous modifications come to mind without significantly departing from the spirit of the invention and the scope of protection is only limited by the scope of the accompanying Claims.

We claim:

1. A barbecue grill assembly comprising:
   a support frame assembly having a left frame assembly and a right frame assembly, the left and right frame assemblies having a front frame member, a rear frame member, and a side member connecting the front and rear members; and,
   a cooking chamber having a firebox, the firebox having a pair of opposed end walls, each end wall having a mounting assembly extending from an outer surface of the end wall, wherein the mounting assembly has both a horizontal component that engages an upper surface of the front and rear frame members and a first vertical wall that engages an extent of an outer surface of the front frame member when the cooking chamber is connected to the support frame assembly.

2. The barbecue grill assembly of claim 1 wherein the mounting assembly extends substantially perpendicular to the outer surface of the end wall.

3. The barbecue grill assembly of claim 2 wherein the mounting assembly engages an upper surface of the front and rear frame members.

4. The barbecue grill assembly of claim 3 wherein the mounting assembly engages an outer surface of the front and rear frame members.

5. The barbecue grill assembly of claim 1, the mounting assembly further having a second vertical wall that engages an extent of an outer surface of the rear frame member.

6. The barbecue grill assembly of claim 1, the mounting assembly further having at least one rib extending from the outer surface of the end wall, wherein the rib engages an inner portion of the side member when the cooking chamber is connected to the support frame assembly.

7. The barbecue grill assembly of claim 6 wherein a slot is defined between the mounting assembly and an upper edge of the side member.

8. The barbecue grill assembly of claim 6 wherein the rib is positioned adjacent to the mounting assembly.

9. The barbecue grill assembly of claim 8 wherein the rib has a width and the mounting assembly has a width, the rib width being less than the mounting assembly width.

10. The barbecue grill assembly of claim 1, wherein the end wall is formed from a casting process.

11. A barbecue grill assembly comprising:
a support frame assembly having a left frame assembly and a right frame assembly, the left and right frame assemblies having a front frame member, a rear frame member, and a side member connecting the front and rear members, the support frame assembly further having at least one horizontal member that connects the front frame members of the left and right frame assemblies; and,
a cooking chamber having a firebox, the firebox having a pair of opposed end walls, the end walls having a mounting ledge extending from an outer surface of the end wall, wherein the mounting ledge engages an upper surface of the front and rear frame members in an assembled position; and wherein a first vertical wall depends from the ledge and engages an extent of an outer surface of the front frame member in the assembled position.

12. The barbecue grill assembly of claim 11 wherein the mounting ledge is an elongated structure that extends substantially perpendicular to the outer surface of the end wall.

13. The barbecue grill assembly of claim 11, wherein a second vertical wall depends from the ledge and engages an extent of an outer surface of the rear frame member in the assembled position.

14. The barbecue grill assembly of claim 13, wherein the first and second vertical walls are spaced a distance along the ledge.

15. The barbecue grill assembly of claim 14, wherein at least one rib extends from the outer surface of the end wall, and wherein the rib engages a portion of the side member in the assembled position.

16. The barbecue grill assembly of claim 15 wherein the rib is positioned adjacent to the ledge.

17. The barbecue grill assembly of claim 15 wherein a slot is defined between the ledge and an upper edge of the side wall.

18. The barbecue grill assembly of claim 11 wherein the end wall has a receptacle configured to receive controls for the grill assembly.

19. The barbecue grill assembly of claim 11 wherein the ledge is positioned above the first horizontal member in the assembled position.

20. The barbecue grill assembly of claim 19, the support frame assembly further having a second horizontal member that connects the front frame members of the left and right frame assemblies.

21. The barbecue grill assembly of claim 20 wherein the ledge and the first horizontal member are positioned above the second horizontal member in the assembled position.

22. The barbecue grill assembly of claim 11 wherein the end wall and the ledge are formed from cast material.

23. A barbecue grill assembly comprising:
a support frame assembly having a left frame assembly and a right frame assembly, the left and right frame assemblies having a front frame member, a rear frame member, and a side member connecting the front and rear members; and,
a cooking chamber having a firebox, the firebox having a pair of opposed end walls, the end walls having a mounting ledge extending from an outer surface of the end wall, the end wall further having a pair of rails extending from the outer surface of the end wall wherein the rails define a channel configured to receive and secure a conduit used during the operation of the grill assembly.

24. The barbecue grill assembly of claim 23 wherein the rails extend substantially perpendicular to the outer surface of the end wall.

25. The barbecue grill assembly of claim 23 wherein the channel has a first opening configured to receive a first portion of the conduit.

26. The barbecue grill assembly of claim 25 wherein the first opening is positioned adjacent a first end of the channel.

27. The barbecue grill assembly of claim 25 wherein the channel has a second opening configured to receive a second portion of the conduit.

28. The barbecue grill assembly of claim 23, wherein a first wall depends from a first end of the mounting ledge and second wall depends from a second end of the mounting ledge.

29. The barbecue grill assembly of claim 28, wherein the channel has a first opening configured to receive a first portion of the conduit, the first opening positioned adjacent the first wall.

30. The barbecue grill assembly of claim 29, wherein the channel has a second opening configured to receive a second portion of the conduit, the second opening positioned adjacent the second wall.

31. The barbecue grill assembly of claim 23 wherein the mounting ledge engages a limited extent of the front and rear frame members when the cooking chamber is connected to the support frame assembly.

32. The barbecue grill assembly of claim 31, wherein the channel does not engage the front and rear frame members when the cooking chamber is connected to the support frame assembly.

33. The barbecue grill assembly of claim 23, wherein the end wall is formed from a casting process.

34. The barbecue grill assembly of claim 23, wherein the end wall and the channel are integrally formed from cast material.

* * * * *